United States Patent [19]

Skoultchi

[11] 4,081,308

[45] Mar. 28, 1978

[54] RAPID CURING TWO PART ADHESIVES

[75] Inventor: Martin M. Skoultchi, Somerset, N.J.

[73] Assignee: National Starch and Chemical Corporation, Bridgewater, N.J.

[21] Appl. No.: 819,570

[22] Filed: Jul. 27, 1977

[51] Int. Cl.$^2$ .............................................. B32B 7/00
[52] U.S. Cl. ................................. 156/310; 156/314; 156/331; 156/316; 156/332; 260/885; 427/302; 428/420; 526/146; 526/320; 526/147; 526/328
[58] Field of Search ............... 156/310, 331, 314, 332, 156/316, 334; 427/407 R, 407 A, 333, 419 G, 340, 302; 428/420, 463, 442, 522; 252/426, 431 R; 526/146, 172, 147, 319, 170, 320, 328; 260/885

[56] References Cited

U.S. PATENT DOCUMENTS

| | | | |
|---|---|---|---|
| 2,776,952 | 1/1957 | Bredereck et al. | 526/146 |
| 2,846,418 | 8/1958 | Bredereck et al. | 526/123 |
| 2,894,932 | 7/1959 | Bäsel et al. | 156/332 |
| 2,935,489 | 5/1960 | Bäsel et al. | 526/147 |
| 3,046,262 | 7/1962 | Krieble | 156/332 |
| 3,489,599 | 1/1970 | Krieble | 428/463 |
| 3,634,379 | 1/1972 | Hauser | 526/319 |
| 3,658,624 | 4/1972 | Lees | 156/310 |

*Primary Examiner*—William A. Powell
*Assistant Examiner*—J. J. Gallagher
*Attorney, Agent, or Firm*—Edwin Szala; Ellen T. Dec

[57] ABSTRACT

A two part adhesive composition characterized by rapid curing and long shelf life is disclosed. The adhesive composition comprises a first component of an acrylic monomer and copper saccharinate or saccharin and a soluble copper salt and a second component comprising an alpha-hydroxy sulfone or an alpha-amino sulfone or mixtures thereof which functions as an activator therefor.

14 Claims, No Drawings

RAPID CURING TWO PART ADHESIVES

BACKGROUND OF THE INVENTION

I. Field of the Invention

The present invention is directed to a two part adhesive system characterized by rapid curing and long shelf life as well as to a process for the adhesive bonding of surfaces therewith.

II. Brief Description of the Prior Art

Multi-part ethylenically unsaturated adhesive systems useful for rapidly bonding surfaces are known in the art. Most of these systems are based on the use of polymerization accelerators which are used to increase the rate of cure of the unsaturated monomeric base. Until recently, however, it has been difficult to obtain a stable, innocuous accelerator system for acrylate-based adhesive systems. The latter systems are desirable for their ease and flexibility in formulation and application as well as for the desirable tensile strength and heat resistant properties of the cured bond. U.S. Pat. Nos. 3,591,438 to Toback et al. and 3,616,040 to Toback present multi-part adhesive systems comprising a peroxy-catalyzed acrylate monomer and an accelerating agent containing an aldehyde-amine condensation product. Further, my copending application, Ser. No. 715,529 filed Aug. 18, 1976, discloses a two-part system wherein a copper-saccharin-p-toluenesulfinic acid salt inter-reaction mixture catalyzes the polymerization of an acrylic monomer.

SUMMARY OF THE INVENTION

I have now found that acrylic-based adhesive compositions characterized by rapid curing and extended shelf-life may be prepared by catalyzing an acrylic monomer with the inter-reaction mixture of copper salts, saccharin and an alpha-hydroxy sulfone, an alpha-amino sulfone or mixtures thereof. The novel adhesives of the present invention are characterized as two part adhesive systems comprising (a) the adhesive base and (b) an activator therefor. More specifically, part (a) of the novel adhesive comprises the acrylic monomer and a saccharin component present in the form of the copper salt of saccharin or as saccharin and a soluble copper salt or as a mixture thereof. Part (b) of the system comprises an alpha-hydroxy sulfone, an alpha-amino sulfone or mixtures thereof.

When curing is desired, the two separate components are applied to the surfaces to be bonded and, when the surfaces are joined, produce what is postulated to be a copper-saccharin-sulfone inter-reaction mixture thereby catalyzing the polymerization of the acrylic monomer.

Although the catalytic effects of the alpha-hydroxy sulfone and alpha-amino sulfone on anaerobic acrylic compositions have been described in copending applications, Ser. No. 579,782 filed May 22, 1975 and Ser. No. 627,900 filed Nov. 3, 1975, respectively, the rapid curing achieved by the addition of relatively large amounts of copper to the compositions of the present invention is surprising and unexpected in view of the prior art. Thus, while references such as U.S. Pat. No. 2,370,010 teach that small amounts of copper (e.g., on the order of less than 3 parts per million) are known to act as accelerators in some polymerization systems, and other references (e.g., the copending applications mentioned hereinabove) teach that curing may be hastened by use of active copper substrates or substrates which have been treated with copper primers or "soaps" (which provide copper concentrations in the range of less than 10 parts per million), the presence of amounts of copper in excess of about 15 parts per million in conventional vinyl-polymerization systems has been shown to exhibit inhibitory effects on the polymerization rate and may, in fact, totally inhibit the polymerization reaction at higher levels.

An additional embodiment of the present invention includes a process for bonding surfaces comprising the steps of (1) applying to at least one of such surfaces the adhesive base described above as part (a); (2) applying to at least one of such surfaces the activator described above as part (b); and (3) placing the surfaces so treated in abutting relation until the adhesive composition polymerizes and bonds the surfaces together.

DETAILED DESCRIPTION OF THE PREFERRED EMBODIMENTS

The preferred polymerizable monomers used in part (a) of the present invention are the monofunctional hydroxysubstituted acrylates and methacrylates characterized by the formula:

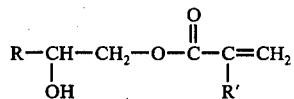

wherein R is hydrogen, phenyl, methyl, ethyl or $C_1$-$C_{18}$ alkoxymethyl and R' is hydrogen or methyl. Such monomers include hydroxyethyl acrylate, hydroxypropyl acrylate, 2-hydroxybutyl acrylate as well as the corresponding methacrylates.

In addition to those monomers represented above, other useful monomers are other monofunctional acrylate esters and the amide, cyano, chloro and silane substituted derivatives thereof such as methyl acrylate, methyl methacrylate, ethyl acrylate, ethyl methacrylate, butyl acrylate, n-octyl acrylate, 2-ethylhexyl acrylate, decylmethacrylate, dodecyl methacrylate, cyclohexyl methacrylate, tert-butyl methacrylate, acrylamide, acrylonitrile, N-methylolacrylamide, diacetone acrylamide, N-tertbutyl acrylamide, N-tert-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

Difunctional acrylates are also useful herein and include those corresponding to the general formula:

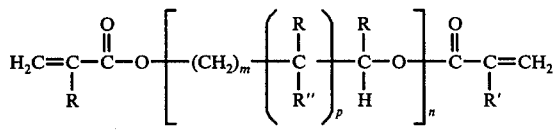

wherein R is selected from the group consisting of hydrogen, methyl, ethyl,

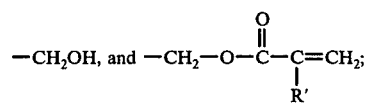

R' is selected from the group consisting of hydrogen, chlorine, methyl and ethyl;

R" is selected from the group consisting of hydrogen, hydroxy, and

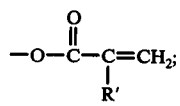

m is an integer equal to at least 1, e.g., from 1 to 8 or higher and preferably from 1 to 4 inclusive;
n is an integer equal to at least 1, e.g., from 1 to 20 or more; and
p is one of the following: 0 or 1.

Monomers useful in this invention and which come within the above general formula include, for example, ethylene glycol dimethyacrylate, ethylene glycol diacrylate, polyethylene glycol diacrylate, dimethacrylic ester of tetraethylene glycol, diglycerol diacrylate, diethylene glycol dimethacrylate, pentaerythritol triacrylate, and other polyester diacrylates and dimethacrylates.

The above class of monomers is in essence described in U.S. Pat. No. 3,043,820 issued July 10, 1962 (to R. H. Krieble).

Other difunctional polymerizable monomers useful in my compositions correspond to the general formula:

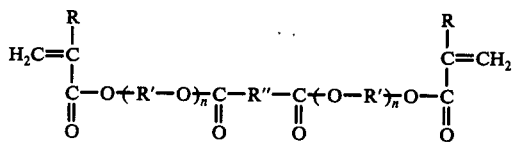

wherein
R represents hydrogen, chlorine, methyl or ethyl,
R' represents alkylene with 2-6 carbon atoms,
R" represents $(CH_2)_m$ in which m is an integer of from 0 to 8,

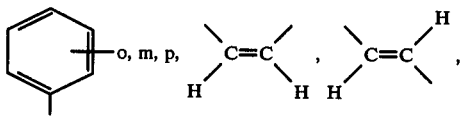

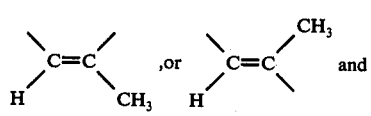

n represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) malonate, dimethacrylate of bis(tetraethylene glycol) sebacate, dimethacrylate of bis(ethylene glycol) phthalate, dimethacrylates of bis(tetraethylene glycol) maleate, and the diacrylates and α-chloroacrylates corresponding to said dimethacrylates, and the like.

The above class of monomers is in essence described in U. S. Pat. No. 3,457,212 issued July 22, 1969 (Sumitomo Chemical Company, Ltd.).

Also useful herein are monomers which are isocyanate-hydroxyacrylate or isocyanate-aminoacrylate reaction products which may be characterized as acrylate terminated polyurethanes and polyureides or polyureas or as polyether or polyester urethanes or co-polyether polyester urethanes. These monomers correspond to the general formula:

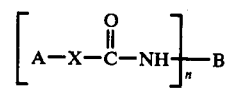

wherein X is selected from the group consisting of —O— and

and R is a member selected from the group consisting of hydrogen and lower alkyl of 1 to 7 carbon atoms; A represents the organic residue of an active hydrogen containing acrylic ester wherein the active hydrogen has been removed, the ester being hydroxy or amino substituted on the alkyl portion thereof and the methyl, ethyl and chlorine homologs thereof; n is an integer from 1 to 6 inclusive; and B is a mono- or polyvalent organic radical selected from the group consisting of alkyl, alkylene, alkenylene, cycloalkyl, cycloalkylene, aryl, aralkyl, alkaryl, poly(oxyalkylene), poly(carboalkoxyalkylene), poly(oxyalkylene-urethane), poly(carboalkoxyalkene-urethane), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,425,988 issued Feb. 4, 1969 (Loctite Corporation).

Another class of monomers useful in the present application are the mono- and polyacrylate and methacrylate esters of bisphenol type compounds. These monomers may be described by the formula:

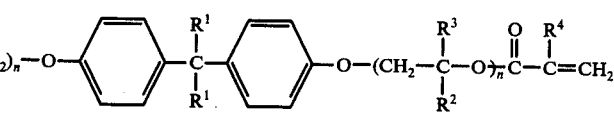

Where $R^1$ is methyl, ethyl, carboxyl or hydrogen; $R^2$ is hydrogen, methyl or ethyl; $R^3$ is hydrogen, methyl or hydroxyl; $R^4$ is hydrogen, chlorine, methyl or ethyl and n is an integer having a value of 0 to 8.

Representative monomers of the above-described class include: dimethacrylate and diacrylate esters of 4,4'bishydroxyethoxy-bisphenol A; dimethacrylate and diacrylate esters of bisphenol A; etc. These monomers are essentially described in Japanese Patent Publication 70-15640 to Toho Chemical Manuf. Ltd.

The monomers useful herein are thus seen to be polymerizable monomers having one or more acrylate or methacrylate groups as a common, unifying characteristic, and for convenience may be generically termed acrylic and substituted acrylic monomers.

In preparing this component of the adhesive system, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomer such as unsaturated hydrocarbons, unsaturated esters and ethers, vinyl esters and the like. Typical optional comonomers may therefore include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic polymerizable comonomer(s) may be added to constitute up to about 60%, by weight, of the monomer composition. Preferably, however, the optional non-acrylic comonomer will constitute no more than 50%, by weight, of the monomer composition, and most preferably, it will constitute no more than 30%, by weight, of the monomer composition.

It is also to be noted in selecting the acrylate monomer of component (a) that the choice thereof will also affect the bond strength of the resultant cured polymer. Thus, in order to maintain or increase the bond strength of the cured polymer, it may be preferred to use an acrylate monomer having an alcoholic or other relatively polar group substituted thereon. Examples of such polar groups in addition to the hydroxy group include, amino, amido, cyano, mercapto, and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

Where the effect of a polar substituted monomer is desired without its actual use, in some instances a small amount (usually no more than 8%, by weight, of the total composition) of an alkanol may be admixed to the composition. Such useful alkanols include, for example, methanol, ethanol, isopropanol, butanol, etc. While analogous mercapto compounds may be used in place of the alkanols with a comparable beneficial effect, their use is not favored mainly because of their unpleasant, strong odor.

Particularly preferred monomers for use herein are the hydroxyalkyl acrylate and methacrylates in conjunction with the acrylate (or methacrylate) terminated co-polyether-urethane.

It is understood that the various monomers and comonomers useful herein are not required to be in a highly purified state. The monomers or comonomers may be comprised of commercial grades in which inhibitors, stabilizers, or other additives or impurities may be present, as well as those prepared on the laboratory or in pilot plant scale.

Part (a) of the adhesive system also contains saccharin. The saccharin component may either be present as saccharin or as the copper salt of saccharin or as a mixture thereof. Alternatively, the copper salt may be formed in situ from free copper ions and excess saccharin. The saccharin component is generally present in amounts of from 0.05 to 10% by weight of the monomer or to the limit of solubility of the material in the monomer. Preferably, the saccharin component will be present in amounts of 0.1 to 5% by weight of the monomer. Generally, the higher the concentration of free saccharin in the system, the more rapid the rate of cure. If the saccharin component is not provided in the form of its copper salt, it will be necessary to employ a soluble copper salt as an additional component in part (2) of the adhesive system. Suitable soluble copper salts include the naphthenate, octoate, acetate etc. Such salts are used at levels of 0.02 to 5% by weight of the monomer depending upon the fatty acid components of the salt employed. Such levels of copper salt or copper saccharinate will provide copper concentrations, in the final adhesive system, of a minimum of 50 parts per million based on the weight of the monomer.

In order to prepare part (a) of the adhesive composition of the present invention, it is merely necessary to mix the desired amount of the saccharin component with the selected acrylic monomer or monomers which may optionally contain nonacrylic copolymerizable monomers. The optical ingredients can be premixed into the monomer or alternatively admixed into the prepared composition.

One of the advantages of the present system is that part (a) does not require a solvent since the saccharin or copper salt is usually soluble in the monomer. If, however, the presence of a solvent is desired, then any solvent which dissolves the saccharin or the copper salt and is itself soluble in the monomer may be employed. Common solvents are described in the literature and include, for example, alkanols such as methanol, ethanol, butanol and substituted and unsubstituted formamides such as foramide and N,N-dimethyl formamide.

Part (b) of the two part adhesive system of the present invention comprises an alpha-hydroxy sulfone or an alpha-amino sulfone in a suitable solvent. Suitable solvents include the lower alkanols, chlorinated alkanes or alkenes, ketones, etc. In general, the sulfone will be present in the solvent at concentrations of about 0.001 to 5% by weight thereof.

The alpha-hydroxy sulfones useful as catalysts herein are characterized by the formula:

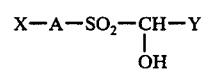

where A is an aliphatic or aromatic radical containing 1 to 18 carbon atoms; X is hydrogen, chlorine, bromine, fluorine, hydroxy, nitro, alkyl ($C_{1-18}$), carboalkoxy ($C_{1-4}$), alkoxy ($C_{1-4}$), aryloxy ($C_{6-10}$) or aryl ($C_{6-10}$); and Y is hydrogen, alkyl ($C_{1-18}$) or ($C_{6-10}$) aryl which may be substituted with chlorine, bromine, flourine, hydroxy, dialkyl amino or alkoxy. Illustrative of the α-hydroxy sulfones included within the scope of the invention are p-tolyl-α-hydroxymethyl sulfone, p-tolyl-α-hydroxybenzyl sulfone, p-tolyl-α-hydroxy(p'-chlorobenzyl) sulfone, p-tolyl-α-hydroxy(p'-N,N'-dimethylamine)benzyl sulfone, etc. Mixtures of various alpha-hydroxy sulfones may also be employed.

These alpha-hydroxy sulfones are prepared by methods well known in the art which generally comprise the reaction of aliphatic or aromatic aldehydes with aromatic or aliphatic sulfinic acids.

The alpha-amino sulfones useful as catalysts herein are characterized by the formula:

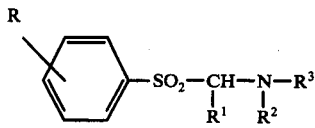

where R is hydrogen or methyl; $R^1$, $R^2$ and $R^3$ are independently hydrogen; hydroxy; $C_1$–$C_{20}$ alkyl; $C_1$–$C_{20}$ alkyl substituted with chlorine, bromine, fluorine, dialkyl($C_1$–$C_6$)amino, carboalkoxy ($C_1$–$C_4$) or alkoxy ($C_1$–$C_4$); $C_6$–$C_{10}$ aryl; or $C_6$–$C_{10}$ aryl substituted with alkyl ($C_1$–$C_8$), chlorine, bromine, fluorine, dialkyl($C_1$–$C_6$)amino, carboalkoxy ($C_1$–$C_4$) or alkoxy ($C_1$–$C_4$); dialkyl($C_1$–$C_6$)amino, or either $R^2$ or $R^3$ may be

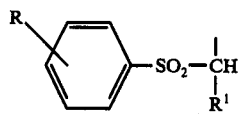

Illustrative of the sulfones included within the scope of the invention are bis(phenylsulfonemethyl)amine, N-methyl-bis(phenylsulfonemethyl)amine, bis(p-tolylsulfonemethyl)amine, N-methyl-bis(p-tolylsulfonemethyl)amine, N-ethyl-bis(p-tolylsulfonemethyl)amine, N-ethanol-bis(p-tolylsulfonemethyl)amine, N-phenyl-p-tolylsulfonemethyl-amine, N-phenyl-N-methyl-p-tolysulfonemethyl-amine, N-phenyl-N-ethyl-p-tolylsulfonemethyl-amine, N-p-tolyl-N-methyl-p-tolylsulfonemethyl-amine, bis-(p-tolylsulfonemethyl)ethylenediamine, tetrakis-(p-tolylsulfonemethyl)ethylenediamine, bis-(p-tolylsulfonemethyl)hydrazine, N-(p-chlorophenyl)-p-tolylsulfonemethyl-amine, N-(p-carboethoxyphenyl)-(p-tolylsulfonemethyl)amine, etc. Mixtures of various alpha-amino sulfones may be employed.

The alpha-amino sulfones are prepared by methods well known in the art and represented by an article by H. Bredereck and E. Bader in Chemische Berichte, 87, 129–39 (1954). Generally the preparation comprises the reaction of aliphatic or aromatic aldehydes with aromatic or aliphatic sulfinic acids and primary or secondary amines or ammonia. The reaction may be carried out in any sequence in either a one-step or two-step operation.

Optionally, either of the components of the adhesive system may also contain a minor amount, up to 50%, by weight, of a polymeric additive, for example, a low or high molecular weight polymer or prepolymer. Illustrative of such polymeric additives are methacrylate polymers such as sold by E. I. DuPont under the trademark ELVACITE, or soluble or dispersible synthetic elastomers. Additionally, in order to further modify the properties of the compositions, they may also contain plasticizers such, for example, as dibutyl phthalate or triethylene glycol. Other optional ingredients include thickeners, stabilizers, organic and inorganic fillers, cut glass fibers, dyes, ultraviolet fluorescent dyes, fluorescent brighteners, etc. It will be recognized that aryl peroxides (e.g. benzyl peroxide) known for their ease of spontaneous decomposition in the presence of sulfones may not be employed in either component of the instant compositions since they will undesirably decompose and curing during storage.

The two components of the adhesive system may be applied to the surfaces to be bonded using any of the conventional methods such as brushing, dipping, casting, spraying, etc. It will be apparent that in most instances the preferred method of application of the activator componenet is by spraying since this results in the production of a thin, uniform film of the activator on the surface while maximizing the rate of solvent vaporization.

The amount of the activator component employed should be sufficient to ensure efficient acceleration of the compositions during curing. Generally, amounts of activator equal to about 0.001 to about 1.0 percent by weight of the acrylic monomer are sufficient and amounts in substantive excess thereof will be unnecessary and may even adversely affect the strength of the final bond. While it is not easy to determine the amount of activator applied to a given surface, adequate results are obtained with a single application by aerosol or otherwise of a thin film of the activator component to at least one of the surfaces to be bonded.

The adhesive acrylate component, designated part (a), can be applied either to the surface which has been treated with the activator or to the appropriate mating surface. The bonding operation is then preferably carried out in a conventional manner by placing the two mating surfaces in abutting relationship and applying a moderate compressive force, if desired, to produce a relatively thin layer of adhesive between the two surfaces. Alternatively, both components may be mixed together and rapidly applied to one or both surfaces immediately prior to bonding. A final adhesive thickness of from 0.01 to 0.15 mm. is preferred when using the adhesives of the present invention.

The compositions of this invention will then cure at ambient temperatures or heat may be used to even further accelerate the rate of curing. Compositions containing significant amounts of hydroxy substituted acrylic monomer are further crosslinked by the application of heat resulting in increased bond strength.

The following examples will further describe and illustrate the practice of this invention but they are not intended to limit its scope. In this examples, all parts are given by weight unless otherwise noted.

EXAMPLES

Preparation of the Copper Salt of Saccharin

A solution of 17.0 g. cupric chloride dihydrate in 300 ml water. A blue crystalline salt of cupric saccharin rapidly formed. It was filtered, washed several times with water and dried. Yield was essentially quantitative.

EXAMPLES 1 – 10

Adhesive base formulations were prepared using the components and amounts shown in Table I. The adhesive base was then applied to one surface of a glass substrate, a 2% solution of p-tolyl-alpha-hydroxymethyl-sulfone in methanol was then sprayed on another glass substrate. After evaporation of the solvent, the two coated surfaces were placed in abutting relationship. The "cure time" (i.e., the time required to prevent movement of the two surfaces by hand) was then determined and recorded in seconds as shown in Table I.

TABLE I

| Example | Monomer | Cu Salt of Saccharin | Saccharin | Cure Time |
|---|---|---|---|---|
| 1 | Hydroxyethyl acrylate | — | 5% | 5 sec. |
| 2 | Hydroxypropyl acrylate | 0.1% | 2% | 7 " |
| 3 | Hydroxypropyl acrylate | 1.0% | — | 20 " |
| 4 | Butyl acrylate | 1.0% | 2% | 15 " |
| 5 | 60% Butyl acrylate and 40% reaction product of polyethyleneglycol 500 with 2 moles toluene diisocyanate, subsequently reacted with 2 moles hydroxyethyl acrylate | 0.5% | 0.5% | 40 " |
| 6 | Dimethacrylate ester of bis(ethyleneglycol)adipate | 0.5% | 0.5% | 60 " |
| 7 | Dimethacrylate ester of bisphenol A | 0.5% | 0.5% | 75 " |
| 8 | 50% Dimethacrylate ester of bis(ethyleneglycol)adipate and 50% hydroxyethyl methacrylate | 0.5% | 0.5% | 35 " |
| 9 | 20% Dimethacrylate ester of bisphenol A and 80% hydroxyethyl methacrylate | 0.5% | 0.5% | 80 " |
| 10 | 70% Reaction product of polyethylene glycol 500 with 2 moles toluene diisocyanate, subsequently reacted with 2 moles hydroxyethyl acrylate and 30% hydroxyethyl methacrylate | 0.5 | 0.5% | 45 " |

EXAMPLE 11 – 14

The procedure employed in Examples 1 – 10 was repeated using, as activator, a 2% solution in methanol of N-phenyl-p-tolylsulfonemethyl-amine. Monomers, amounts and cure times were recorded and are shown in Table II.

TABLE II

| Ex. | Monomer | Cu Salt of Saccharin | Saccharin | Cure Time |
|---|---|---|---|---|
| 11 | Hydroxyethyl acrylate | 0.1% | 2% | 30 sec. |
| 12 | Hydroxyethyl methacrylate | 0.2% | 2% | 30 " |
| 13 | Reaction product of 2 moles hydroxyethyl acrylate and 1 mole toluene diisocyanate | 0.5% | 2% | 35 " |
| 14 | Hydroxypropyl acrylate | 1.0% | 2% | 10 " |

EXAMPLE 13

In formulations similar to those used in Examples 1 – 10, various copolymers were prepared using a mixture of the acrylate monomer and acrylic acid. The formulations and curing times are shown in Table III. All systems contained 0.5% Cu saccharin and 0.5% saccharin in part (a) and used a 1% solution of p-tolylalpha-hydroxymethyl-sulfone in methanol as activator.

TABLE III

| Monomer | Acrylic Acid | Cure Time |
|---|---|---|
| Hydroxyethyl acrylate | 1% | 5 sec. |
| Hydroxypropyl acrylate | 5% | 7 " |
| Reaction product of polyethylene glycol 500 with 2 moles toluene diisocyanate subsequently reacted with 2 moles hydroxyethyl acrylate. | 10% | 45 " |

EXAMPLE 16

Monomer polymer syrups were prepared and cured in accordance with the procedures used in Examples 1 – 10. All formulations contained 0.5% copper saccharinate and 0.5% saccharin in the hydroxypyropyl acrylate polymer syrup and used a 1% solution of the p-tolyl-alpha-hydroxymethyl-sulfone in methanol as the activator. The formulations and approximate curing times are shown in Table IV.

TABLE IV

| Hydroxypropyl Acrylate | Polymer Additive | Cure Time |
|---|---|---|
| 60% | 40% Acrylic Rubber (Hycar 4041) | 3 min. |
| 70% | 30% Polyester (DuPont 49001) | 2 min. |
| 90% | 10% Polyester-urethane (Rucothane P 279) | 1.5 min. |

As will be recognized by those skilled in the art, the foregoing examples are merely exemplary. Variations may be made in ingredients, proportions and procedures as long as such variations are within the scope and spirit of the following claims.

I claim:

1. A process for bonding surfaces comprising the steps of:
   (1) applying to at least one of such surfaces an adhesive base (a) comprising an acrylic monomer and a saccharin component comprising the copper salt of saccharin or saccharin and a soluble copper salt or mixture thereof, said saccharin component being present in an amount of 0.05 to 10% by weight of the monomer and said copper being present in an amount of at least 50 parts per million based on the weight of the monomer;
   (2) applying to at least one of such surfaces an activator (b) comprising an alpha-hydroxy sulfone or an alphaamino sulfone; and
   (3) placing the surfaces so treated in abutting relation until the adhesive composition polymerizes and bonds the surfaces together.

2. The process of claim 1 wherein the acrylic monomer of the adhesive base is a member of the group consisting of compounds of the formula:

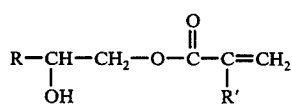

$$R-\underset{\underset{OH}{|}}{CH}-CH_2-O-\overset{\overset{O}{\|}}{C}-\underset{\underset{R'}{|}}{C}=CH_2 \quad (i)$$

wherein R is selected from the group consisting of hydrogen, phenyl, methyl, ethyl or $C_1$ - $C_{18}$ alkoxymethyl and R' is hydrogen or methyl;

(ii) monofunctional acrylate and methacrylate esters and the amide, cyano, chloro and silane substituted derivatives thereof;

4,081,308

$$H_2C=C(R')-C(=O)-O-[(CH_2)_m-(C(R)(R'')-C(R)(H))_p-O]_n-C(=O)-C(R')=CH_2 \quad \text{(iii)}$$

wherein R is selected from the group consisting of hydrogen, methyl, ethyl, $$-CH_2OH, \text{ and } -CH_2-O-C(=O)-C(R')=CH_2;$$

R' is selected from the group consisting of hydrogen, chlorine, methyl and ethyl;

R'' is selected from the group consisting of hydrogen hydroxy, and $$-O-C(=O)-C(R')=CH_2;$$

m is an integer equal to at least 1;
n is an integer equal to at least 1; and p is 0 or 1;

$$H_2C=C(R)-C(=O)-O+R'-O)_n-C(=O)-R''-C(=O)+O-R')_n-O-C(=O)-C(R)=CH_2 \quad \text{(iv)}$$

wherein
R is hydrogen, chlorine, methyl or ethyl,
R' is alkylene with 2–6 carbon atoms,
R'' is selected from the group consisting of $(CH_2)_m$ in which m is an integer of from 0 to 8, phenyl-o,m,p-substituted; $\backslash C=C /$ with H, H;
$\backslash C=C /$ with H, H; $\backslash C=C /$ with H, CH$_3$;

or $\backslash C=C /$ with H, CH$_3$ and CH$_3$;

n is an integer of from 1 to 4;

$$[A-X-C(=O)-NH]_n-B \quad \text{(v)}$$

wherein
X is selected from the group consisting of -O- and $$-N(R)-;$$

R is selected from the group consisting of hydrogen and lower alkyl of 1 to 7 carbon atoms;

A is the organic residue of an active hydrogen containing acrylic ester wherein the active hydrogen has been removed, the ester being hydroxy or amino substituted on the alkyl portion thereof, and the methyl, ethyl and chlorine homologs thereof;

n is an integer from 1 to 6 inclusive; and

B is a mono- or polyvalent organic radical selected from the group consisting of alkyl, alkylene, alkenylene, cycloalkyl, cycloalkylene, aryl, aralkyl, alkaryl, poly(oxyalkylene), poly(carboalkoxyalkylene), poly(oxyalkylene-urethane), poly(carboalkoxyalkene-urethane) and heterocyclic radicals both substituted and unsubstituted:

$$CH_2=C(R^4)-C(=O)-(O-C(R^3)(R^2)-CH_2)_n-O-\text{Ar}-C(R^1)(R^1)-\text{Ar}-O-(CH_2-C(R^3)(R^2)-O)_n-C(=O)-C(R^4)=CH_2 \quad \text{(vi)}$$

where
$R^1$ is selected from the group consisting of methyl, ethyl, carboxyl or hydrogen;
$R^2$ is selected from the group consisting of hydrogen, methyl or ethyl;
$R^3$ is selected from the group consisting of hydrogen, methyl or hydroxyl;
$R^4$ is selected from the group consisting of hydrogen, chlorine, methyl or ethyl; and
n is an integer having a value of 0 to 8.

3. The process of claim 1 wherein the acrylic monomer is polymerizable hydroxyethyl acrylate or polymerizable hydroxyethyl methacrylate.

4. The process of claim 1 wherein the acrylic monomer is a mixture of a polymerizable acrylate or methacrylate with an acrylate or methacrylate terminated copolyether urethane.

5. The process of claim 1 wherein there is present in the adhesive base up to 60% by weight of at least one non-acrylic polymerizable comonomer.

6. The process of claim 1 wherein the activator is employed in an amount equal to 0.001 to 1.0 percent by weight of the acrylic monomer.

7. The process of claim 1 wherein the activator is p-tolyl-alpha-hydroxymethyl sulfone or N-phenyl-p-tolylsufonemethylamine.

8. A two part adhesive composition comprising (a) an adhesive base and (b) an activator therefor wherein the adhesive base (a) comprises an acrylic monomer and a saccharin component comprising the copper salt of saccharin or saccharin and a soluble copper salt or mixtures thereof, said saccharin component being present in an amount of 0.05 to 10% by weight of the monomer; and said copper being present in an amount of at least 50 parts per million based on the weight of the monomer, and the activator (b) comprises an alpha-hydroxy sulfone or an alpha-amino sulfone or mixtures thereof.

9. The adhesive composition of claim 8 wherein the acrylic monomer of the adhesive base is a member of the group consisting of compounds of the formula:

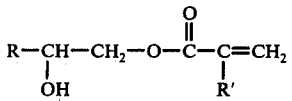  (i)

wherein R is selected from the group consisting of hydrogen, phenyl, methyl, ethyl or $C_1$-$C_{18}$ alkoxymethyl and R' is hydrogen or methyl;

(ii) monofunctional acrylate and methacrylate esters and the amide, cyano, chloro and silane substituted derivatives thereof;

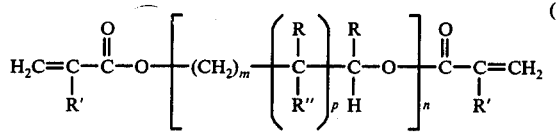  (iii)

wherein R is selected from the group consisting of hydrogen, methyl, ethyl,

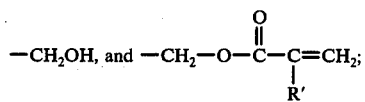

R' is selected from the group consisting of hydrogen, chlorine, methyl and ethyl;
R" is selected from the group consisting of hydrogen, hydroxy, and

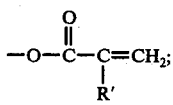

m is an integer equal to at least 1;

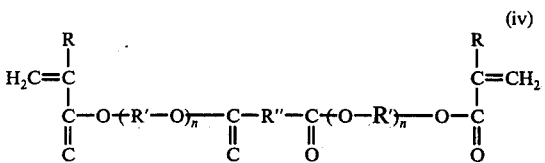

n is an integer equal to at least 1; and
p is 0 or 1;

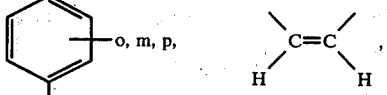 (iv)

wherein
R is hydrogen, chlorine, methyl or ethyl,
R' is alkylene with 2-6 carbon atoms,
R" is selected from the group consisting of $(CH_2)_m$ in which m is an integer of from 0 to 8,

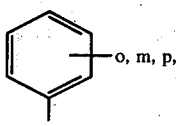

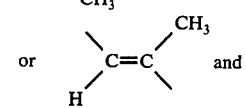

and
n is an integer of from 1 to 4;

$$\left[ A-X-\overset{O}{\underset{\|}{C}}-NH \right]_n B \quad (v)$$

wherein
X is selected from the group consisting of —O— and $$-\underset{\underset{R}{|}}{N}-;$$

R is selected from the group consisting of hydrogen and lower alkyl of 1 to 7 carbon atoms;
A is the organic residue of an active hydrogen containing acrylic ester wherein the active hydrogen has been removed, the ester being hydroxy or amino substituted on the alkyl portion thereof, and the methyl, ethyl and chlorine homologs thereof;
n is an integer from 1 to 6 inclusive; and
B is a mono- or polyvalent organic radical selected from the group consisting of alkyl, alkylene, alkenylene, cycloalkyl, cycloalkylene, aryl, aralkyl, alkaryl, poly(oxyalkylene), poly(carboalkoxyalkylene), poly(oxyalkylene-urethane), poly(carboalkoxyalkene-urethane) and heterocyclic radicals both substituted and unsubstituted:

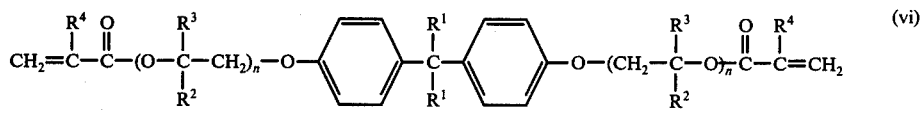 (vi)

where
$R^1$ is selected from the group consisting of methyl, ethyl, carboxyl or hydrogen;
$R^2$ is selected from the group consisting of hydrogen, methyl or ethyl;
$R^3$ is selected from the group consisting of hydrogen, methyl or hydroxyl;
$R^4$ is selected from the group consisting of hydrogen, chlorine, methyl or ethyl; and
n is an integer having a value of 0 to 8.

10. The composition of claim 8 wherein the acrylic monomer is polymerizable hydroxyethyl acrylate or polymerizable hydroxyethyl methacrylate.

11. The composition of claim 8 wherein the acrylic monomer is a mixture of a polymerizable acrylate or methacrylate with an acrylate or methacrylate terminated copolyether urethane.

12. The composition of claim 8 wherein there is present in the adhesive base up to 60% by weight of at least one non-acrylic polymerizable comonomer.

13. The composition of claim 8 wherein the activator is employed in an amount equal to 0.001 to 1.0 percent by weight of the acrylic monomer.

14. The composition of claim 8 wherein the activator is p-tolyl-alpha-hydroxymethyl sulfone or N-phenyl-p-tolylsulfonemethyl-amine.

* * * * *

UNITED STATES PATENT OFFICE
CERTIFICATE OF CORRECTION

Patent No. 4,081,308                     Dated March 28, 1978

Inventor(s)    Martin M. Skoultchi

It is certified that error appears in the above-identified patent and that said Letters Patent are hereby corrected as shown below:

Col. 3, line 16, "dimethyacrylate" should read -- dimethacrylate --. Col. 4, line 59, "Where" should read -- where --. Col. 5, line 12, "comonomer" should read -- comonomers --. Col. 6, line 39, foramide" should read -- formamide --. Col. 7, line 33, "tolysulfonemethyl-amine" should read -- tolylsulfonemethyl-amine --. Col. 7, line 65, "aryl" should read -- aroyl --. Col. 7, line 66, "benzyl" should read -- benzoyl --. Col. 8, line 2, "curing" should read -- cure --. Col. 8, line 8, "componenet" should read -- component --. Col. 8, line 53, after "water" insert -- was mixed with a solution of 48.2 g. sodium saccharin in 200 ml water --. Col. 9, line 23,"EXAMPLE"

UNITED STATES PATENT OFFICE
CERTIFICATE OF CORRECTION

Patent No. 4,081,308　　　　　　　　Dated March 28, 1978

Inventor(s) Martin M. Skoultchi

It is certified that error appears in the above-identified patent and that said Letters Patent are hereby corrected as shown below:

should read -- EXAMPLES --. Col. 10, line 50, "alphaamino" should read -- alpha-amino --. Col. 11, line 18, insert a comma after "hydrogen". Col. 11, line 46 in formula (iv) each "C" over "C" should read -- C over O --. Col. 12, line 60, "tolylsufonemethylamine" should read -- tolylsulfonemethyl-amine --. Col. 13, line 62, in formula (iv) each "C" over "C" should read -- C over O --. Col. 14, line 15, delete "and". Col. 16, line 5, "tolysulfonemethyl-amine" should read -- tolylsulfonemethyl-amine --.

*Signed and Sealed this*

*Twenty-seventh* Day of *March 1979*

[SEAL]

Attest:

RUTH C. MASON
*Attesting Officer*

DONALD W. BANNER
*Commissioner of Patents and Trademarks*